United States Patent [19]

Papadopoulos et al.

[11] Patent Number: 5,594,720

[45] Date of Patent: Jan. 14, 1997

[54] MULTIPLE ACCESS CELLULAR COMMUNICATION WITH DYNAMIC SLOT ALLOCATION AND REDUCED CO-CHANNEL INTERFERENCES

[75] Inventors: Haralabos C. Papadopoulos, Cambridge, Mass.; Carl-Erik W. Sundberg, Chatham, N.J.

[73] Assignee: Lucent Technologies Inc., Murray Hill, N.J.

[21] Appl. No.: 364,579

[22] Filed: Dec. 27, 1994

Related U.S. Application Data

[63] Continuation-in-part of Ser. No. 157,778, Nov. 24, 1993, Pat. No. 5,420,851.

[51] Int. Cl.$^6$ .............................. H04J 4/00; H04Q 7/36
[52] U.S. Cl. ............................................ 370/330; 370/337
[58] Field of Search ........................... 370/17, 24, 29, 370/30, 50, 61, 69.1, 79, 80, 81, 85.6, 95.1, 95.3; 379/59, 60; 455/33.1, 33.4, 56.1

[56] References Cited

U.S. PATENT DOCUMENTS

| | | | |
|---|---|---|---|
| 4,485,486 | 11/1984 | Webb et al. .................. | 455/62 X |
| 4,841,521 | 6/1989 | Amada et al. . | |
| 4,949,335 | 8/1990 | Moore . | |
| 4,979,170 | 12/1990 | Gilhousen et al. . | |
| 4,987,571 | 1/1991 | Haymond et al. . | |
| 5,025,442 | 6/1991 | Lynk et al. . | |
| 5,117,423 | 5/1992 | Shepherd et al. . | |
| 5,185,739 | 2/1993 | Spear .................. | 370/95.3 |
| 5,200,956 | 4/1993 | Pudney et al. . | |
| 5,241,542 | 8/1993 | Natarajan et al. .................. | 370/95.3 |

OTHER PUBLICATIONS

Amitay, N., and Nanda, S., "Resource Auction Multiple Access (RAMA) for Statistical Multiplexing of Speech in Wireless PCS," in ICC'93, Conf. Rec., (Geneva, Switzerland), May 1993, pp. 605–609.

Brady, P. T., "A Model for Generating On–Off Speech Patterns in Two–Way Conversation," Bell Syst. Tech. Jour., vol. 48, No. 7, Sep. 1969, pp. 2445–2472.

Bursh, Jr., T. P., et al., "Digital Radio for Mobile Applications," AT&T Technical Journal, Jul./Aug. 1993, pp. 19–26.

Chang, J. J. C., et al., "Wireless Systems and Technologies: An Overview," AT&T Technical Journal, Jul./Aug. 1993, pp. 11–18.

Cox, D. C., "Universal Portable Radio Communications," Proc. IEEE, vol. 75, No. 4, Apr. 1987, pp. 436–477.

Cox, D. C., et al., "New Directions in Subband coding," IEEE J. Select. Areas Commun. (Special Issue on Voice Coding for Communications), vol. SAC–6, No. 2, Feb. 1988, pp. 391–409.

Gerson, I. A., and Jasiuk, M. A., "Vector Sum Excited Linear Prediction (VSELP) Speech Coding at 8 Kbps," ICASSP'90, Albuquerque, Apr. 1990, pp. 461–464.

(List continued on next page.)

*Primary Examiner*—Melvin Marcelo

[57] ABSTRACT

An apparatus and method for reducing co-channel interference in multiple-access cellular communication systems in which frame time or frequency slots are allocated between uplink and downlink. An omnidirectional antenna or a set of directional antennas are used in each cell base station to communicate with users. The frame slots in which the antennas communicate uplink and downlink information are arranged in accordance with a predetermined frame organization to reduce mixed co-channel interference (CCI). Mixed CCI occurs when a downlink transmission from one base station antenna in a given cell interferes with uplink reception in another base station antenna in a frequency reuse (FR) cell. A potentially-interfering antenna in a given cell is therefore directed to transmit downlink information in a different portion of the frame than that in which a potentially-interfered-with antenna in the frequency reuse cell receives uplink information. The frame slots may be allocated such that only a portion of the available slots are dynamically allocated in accordance with user demand, while the remaining portions are assigned to either uplink or downlink communication.

34 Claims, 8 Drawing Sheets

OTHER PUBLICATIONS

Gilhousen, K. S., et al., "On the Capacity of a Cellular CDMA System," IEEE Trans. on Veh. Tech., vol. 40, No. 2, May 1991, pp. 303–312.

Goodman, D. J., "Cellular Packet Communications," IEEE Trans. on Commun., vol. COM–38, No. 8, Aug. 1990, pp. 1272–1280.

Goodman, D. J., "Embedded DPCM for Variable Bit Rate Transmission," IEEE Trans. on Commun., vol. COM–28, No. 7, Jul. 1980, pp. 1040–1046.

Goodman, D. J., "Second Generation Wireless Information Networks," IEEE Transactions on Vehicular Technology, vol. 40, No. 2, May 1991, pp. 366–374.

Goodman, D. J., and Sundberg, C–E. W., "Transmission Errors and Forward Error Correction in Embedded Differential Pulse Code Modulation," Bell Syst. Techn. Jour., vol. 62, No. 9, Nov. 1983, pp. 2735–2764.

Goodman, D. J., et al., "Packet Reservation Multiple Access for Local Wireless Communications," IEEE Transactions on Communications, vol. 37, No. 8, Aug. 1989, pp. 885–889.

Goodman, D. J., et al., "Waveform Substitution Techniques for Recovering Missing Speech Segment in Packet Voice Communications," IEEE Trans. on ASSP, vol. ASSP–34, No. 6, Dec. 1986, pp. 1440–1448.

Grillo, D., MacNamee, G., "European Perspectives on Third Generation Personal Communication Systems," 40th IEEE Vehicular Tech. Conf., Orlando, May 1990, Conf. Rec. pp. 135–140.

Gruber, J., and Strawczynski, L., "Subjective Effects of Variable Delay and Speech Clipping in Dynamically Managed Voice Systems," IEEE Trans. on Commun., vol. COM–33, No. 8, Aug. 1985, pp. 801–808.

Hagenauer, J., et al., "The Performance of Rate–Compatible Punctured Convolutional Codes for Digital Mobile Radio," IEEE Trans. on Commun., vol. COM–38, No. 7, Jul. 1990, pp. 966–980.

Lam, S. S., "Packet Broadcast Networks—A Performance Analysis of the R–ALOHA Protocal," IEEE Transactions on Computers, vol. C–29, No. 7, Jul. 1980, pp. 596–603.

Mallinder, B. J. T., "An Overview of the GSM System," Third Nordic Seminar on Digit Land Mobile Radio Communications, Copenhagen, Denmark, Sep. 1988, Conf. Rec. pp. 3.1.1–3.1.13.

Miki, T., et al., "Pseudo–Analog Speech Transmission in Mobile Radio Communication Systems," Reprinted from IEEE Transactions on Vehicular Technology, vol. 42, No. 1, Feb. 1993, pp. 69–77.

Nanda, S., and Yue, O–C., "Variable Partition Duplexing for Wireless Communications," Globecom'91, Phoenix, Arizona, Nov. 1991, Conf. Rec. pp. 32.6.1–32.6.7.

Ochsner, H., "DECT—Digital European Cordless Telecommunications," 39th IEEE Vehicular Tech. Conf., San Francisco, California, May 1989, Conf. Rec. pp. 718–721.

Ohno, K., and Adachi, F., "QDPSK Signal Transmission Performance with Postdetection Selection Diversity Reception in Land Mobile Radio," IEEE Trans. on Veh. Tech., vol. VT–40, No. 3, Nov. 1991, pp. 798–804.

Paratz, L. M., and Jones, E. V., "Speech Transmission Using an Adaptive Burst Mode Technique," IEEE Transactions on Communications, vol. COM–33, No. 6, Jun. 1985.

Seshadri, N., et al., "Advanced Techniques for Modulation, Error Correction, Channel Equalization, and Diversity," AT&T Technical Journal, Jul./Aug. 1993, pp. 48–63.

Steele, R., "The Cellular Environment of Lightweight Handheld Portables," IEEE Commun. Mag., vol. 28, No. 7, Jul. 1990, pp. 20–29.

Sundberg, C–E., W., and Seshadri, N., "Digital Cellular Systems for North America," IEEE Global Telecommunications Conference & Exhibition, Globecom'90, vol. 1, *Communications: Connecting the Future,* San Diego, CA, Dec. 2–5, 1990.

Swain, R. S., and Holmes, D. W. J., "The Digital Cordless Telecommunication Common Air Interface," British Telecom Tech. Jour., vol. 8, No. 1, Jan. 1990, pp. 12–18.

Wong, W. C., and Kuek, S. S., "Analytical Model for Variable Partition Duplexing," Electronic Letters, vol. 29, Aug. 1993, pp. 1513–1514.

Wong, W. C., et al., "Low Delay, High Quality Wireless Digital Speech Communications by Shared Time Division Duplexing," Globecom'93, Conf. Proc., Houston, TX, Nov. 1993, 5 pages.

Wong, W. C., et al., "Shared Time Division Duplexing: An Approach to Low–Delay High–Quality Wireless Digital Speech Communications," Reprinted from IEEE Transactions on Vehicular Technology, vol. 43, No. 4, Nov. 1994, pp. 934–945.

Wong, W. C., et al., "STDD, An Approach to Low Delay, High Quality Wireless Speech Communications," IEEE 44th Vehicular Technology Conference, vol. 1, Conf. Proc., Stockholm, Sweden, Jun. 8–10, 1994, pp. 316–320.

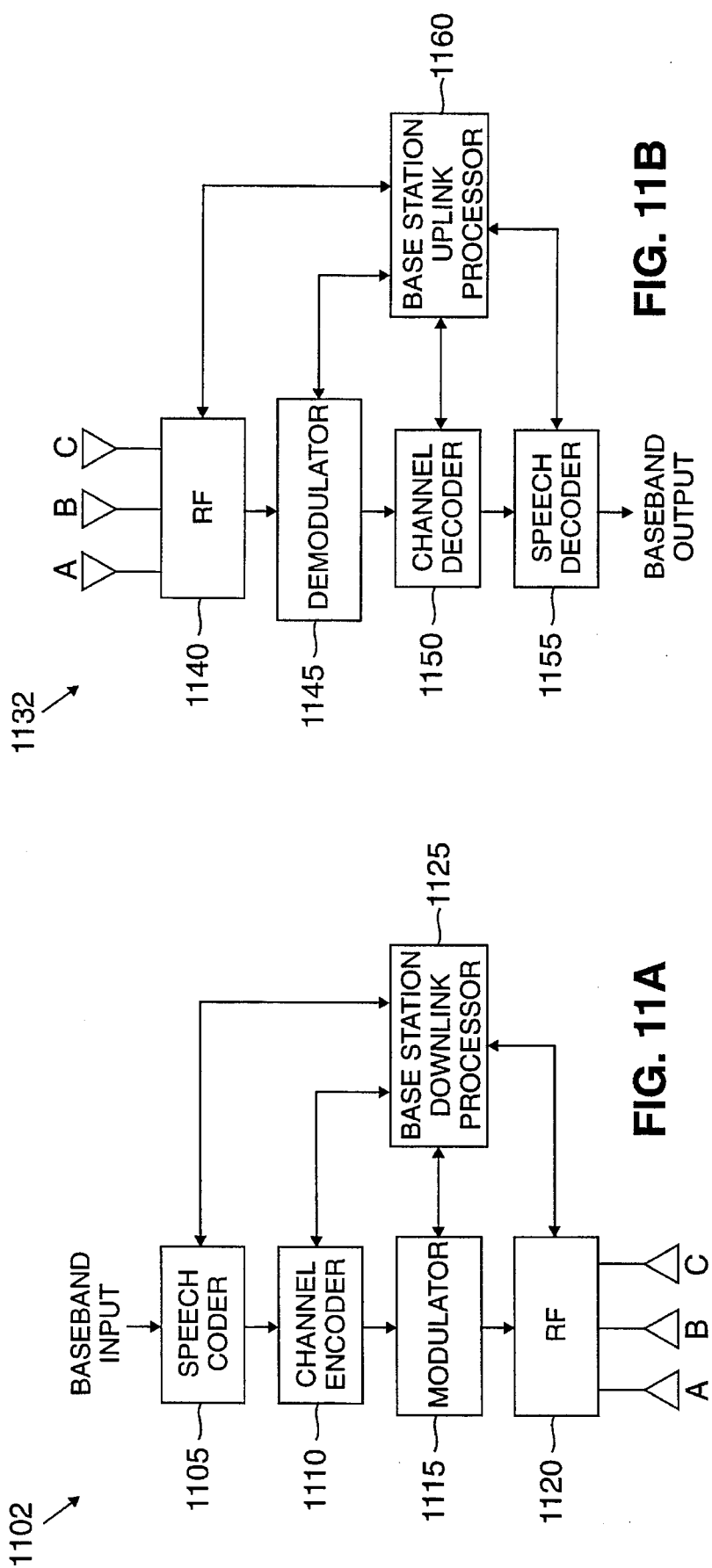

MULTIPLE ACCESS CELLULAR COMMUNICATION WITH DYNAMIC SLOT ALLOCATION AND REDUCED CO-CHANNEL INTERFERENCES

CROSS-REFERENCE TO RELATED APPLICATION

The present invention is a continuation-in-part of Ser. No. 157,778, filed Nov. 24, 1993, now U.S. Pat. No. 5,420,851 entitled "Method of Multiple Access" and assigned to the assignee of the present invention.

TECHNICAL FIELD

The present invention relates to a multiple access technique for a communication system. More particularly, the present invention relates to wireless communication systems utilizing multiple access techniques which involve, for example, allocating available frame time slots to uplink and downlink communication.

BACKGROUND OF THE INVENTION

The design of a communication network or system involves evaluating physical constraints, for example, the characteristics of a given communication channel, and system constraints, for example, the available bandwidth per channel, in order to achieve a network with desired performance characteristics, such as reliability of the information received. Cellular systems typically require low throughput delay of information and high reliability of information transfer and high capacity while restricting the bandwidth of each cellular frequency band.

Current wireless networks utilize multiple access techniques which multiplex users together in order to efficiently utilize network resources. In particular, these networks use either TDMA (time-division multiple access) with FDD (frequency-division duplexing) as in the pan-European GSM system (now also known as Global System for Mobile Communication) and the North American IS-54 system, or a variant, TDMA/TDD (time-division duplexing), as in the Digital European Cordless Telecommunications (DECT) system. See D. J. Goodman, "Second Generation Wireless Information Networks," IEEE Trans. Veh. Tech., VT-40, No. 2, pp. 366–374, May 1991.

For the multiple access systems described here, frames of time are the basic transmission unit. Each frame is divided into a plurality of slots of time. Some slots are used for control purposes and some slots are used for information transfer as described below. The information is transmitted during slots in the frame where slots are assigned to a specific user. Throughout this disclosure, it is understood that the term "information" refers to data representing speech, text, video or other digital information.

Other multiple access techniques, such as PRMA (Packet Reservation Multiple Access) and R-ALOHA (Reservation ALOHA), recognize the bursty nature of speech packets and increase system capacity by having a reservation mechanism for time slots. See D. J. Goodman, R. A. Valenzuela, K. T. Gayliard and B. Ramamurthi, "Packet Reservation Multiple Access for Local Wireless Communications," IEEE Trans. Comm., COM-37, No. 8, pp. 885–890, August 1989; and S. S. Lam, "Packet Broadcast Network—A Performance Analysis of the RALOHA Protocol," IEEE Trans. Comp., COMP-29, No. 7, pp. 596–603, July 1980. Although able to support a large number of users on a given channel bandwidth, these approaches have limited operating ranges, and in the case of PRMA, perform poorly under low delay constraints. In addition, PRMA techniques rely on actual speech transmission, that is, the user must be actively speaking, to allocate slots instead of relying on a separate control mechanism for allocating slots. This assignment method leads to collisions between packets of data and thus increases delay and reduces throughput. Other systems recognize that in a two-way conversation, it often occurs that only one user is active, thereby making it possible to obtain a high statistical multiplexing gain even with a low number of users when information from both conversation paths are multiplexed onto a common channel. See L. M. Paratz and E. V. Jones, "Speech Transmission Using an Adaptive Burst Mode Technique," IEEE Trans. Comm., COM-33, No. 6, pp. 588–591, June 1985; and S. Nanda and O. C. Yue, "Variable Partition Duplexing for Wireless Communications," GLOBECOM '91, pp. 32.6.1–32.6.7. However, such systems have typically been used to dynamically vary bandwidth assigned to two parties in a single conversation (duplex voice link). This reduces speech quality when both parties are talking simultaneously or when their speech overlaps. In addition, managing slot assignment is difficult since fractional slot assignment is necessary. Thus, there is a need for a multiple access system capable of providing high capacity, high quality and low delay communications, particularly for wireless personal communications systems competing with wired systems.

SUMMARY OF THE INVENTION

In accordance with one aspect of the present invention, a multiple access technique is described in which slots are dynamically allocated between uplink and downlink users. In a preferred embodiment, a method is presented for allocating slots in a communication system adapted to communicate information in an assigned slot on uplinks and downlinks between a user pair in a set of N user pairs. The method generates a set of frames, where each frame contains S information slots, $S=U_s+D_s+A$, having $U_s$ slots allocated for communicating information on the uplink, having $D_s$ slots allocated for communicating information on the downlink, and having A, $A \geq 0$, unused slots. $U_s$ and $D_s$ are varied dynamically in such a way as to improve overall system quality and capacity.

Other embodiments of the present invention may permanently assign a portion of the available information slots in a given frame to either the uplink or downlink users. The remaining unassigned slots are then dynamically allocated between uplink and downlink users in accordance with demand. These other embodiments are referred to herein as partially-shared time division duplexing (PSTDD) embodiments. PSTDD can be used to reduce the effects of certain types of co-channel interference (CCI) which may arise in, for example, a time-division multiple access (TDMA) type system with dynamic slot allocation.

Another aspect of the present invention involves utilizing a plurality of base station directional antennas in conjunction with a suitable allocation of frame time or frequency slots to a particular directional antenna. The directional antennas and corresponding slot-direction organization of the frame can minimize the impact of CCI resulting from, for example, shared uplink and downlink slots in neighboring frequency reuse (FR) cells of an STDD or PSTDD cellular communication system. In other embodiments, an omnidirectional antenna can be used in place of a set of base station directional antennas.

The above-discussed features, as well as additional features and advantages of the present invention, will become apparent by reference to the following detailed description and accompanying drawings.

BRIEF DESCRIPTION OF THE DRAWINGS

FIGS. 11A and 11B are block diagrams of exemplary base station downlink and uplink processing elements in a cellular communication system in accordance with the present invention.

DETAILED DESCRIPTION

Figure 1:
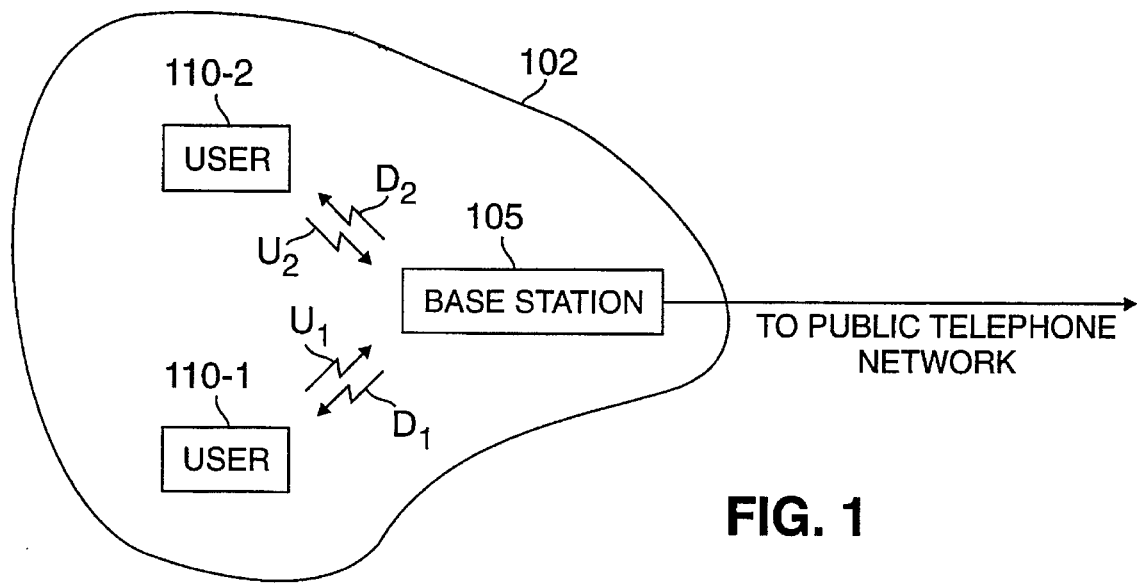
FIG. 1 illustrates the components of a cellular communication system.

FIG. 1 illustrates the components of a cellular or microcellular communications network. Cell 102 represents a portion of the geographic area served by the system. Within each cell is a base station 105 which is connected to the public telephone network. Base station 105 establishes a wireless link with users 110-i, i=1, ... N, wishing to transmit and receive information (that is, digital data representing text, speech, video, etc.) via the public telephone network. The wireless link between any given user pair, 110-i and base station 105, is comprised of an uplink $U_i$ for transmitting information from a user to base station 105 and then to the telephone network and of a downlink $D_i$ for transmitting information received by the base station from the telephone network to the user. Typically, concerns over throughput delay and efficient utilization of bandwidth resources in a network can be addressed by proper design or exploitation of modulation techniques, speech coding methods, channel coding and equalization techniques. See J. J. C. Chang, R. A. Miska and R. A. Shober, "Wireless Systems and Technologies: An Overview," AT&T Tech. J., Vol. 72, No. 4, pp. 11–18, Jul./Aug. 30 1993; T. P. Bursh, Jr. et al., "Digital Radio for Mobile Applications," AT&T Tech. J., Vol. 72, No. 4, pp. 19–26, July/August 1993; and N. Seshadri, C-E. W. Sundberg and V. Weerackody, "Advanced Techniques for Modulation, Error Correction, Channel Equalization, and Diversity," AT&T Tech. J., Vol. 72, No. 4, pp. 48–63, July/August 1993. For example, to minimize delay, space diversity in conjunction with a small degree of channel coding can be used. Low rate speech coders, such as ADPCM, EDPCM or LD-CELP, and modulation methods, such as pseudo-analog skewed DPSK, are also well suited to reducing delay. See T. Miki, C.-E. W. Sundberg and N. Seshadri, "Pseudo-Analog Speech Transmission in Mobile Radio Communications Systems," IEEE Trans. Veh. Tech., Vol. 42, No. 1, pp. 69–77, February 1993. Bandwidth resource concerns may be addressed through proper design of a multiple access technique. The goal of a multiple access technique is to regulate communications for the various user pairs within a cell given a limited number of available frequencies, limited bandwidth per channel, etc. More particularly, proper design of a multiple access system is important in configuring a low delay, high quality digital communication network. See generally, C-E. W. Sundberg and N. Seshadri, "Digital Cellular Systems for North America," GLOBECOM '90, Vol. 1, pp. 533–537, San Diego, Calif., December 1990.

Figure 2:
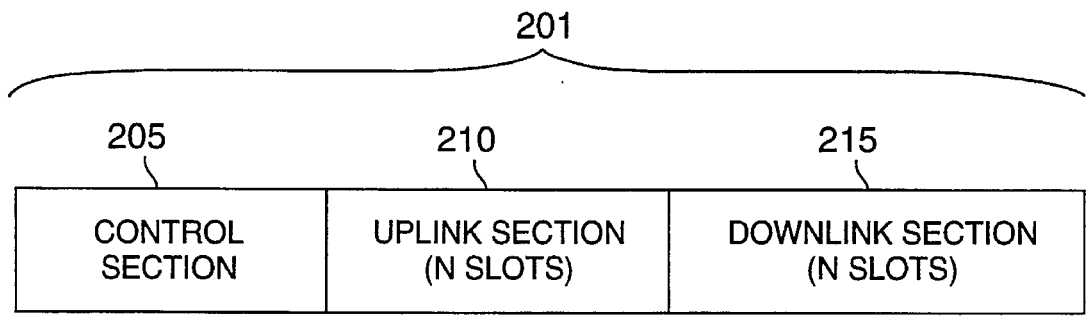
FIG. 2 is a diagram of a TDMA/TDD frame format known in the prior art.

FIG. 2 illustrates the principle of TDMA/TDD for purposes of comparison with other systems. Although standard TDMA/TDD has control information integrated into the headers of information sent in transmitted information slots, for illustrative purposes, frame 201 is divided into three sections all of which are transmitted in the same frequency band. Control section 205 contains information which relates to call management. Uplink section 210 and downlink section 215 are each divided into N slots. Thus, the uplink and downlink for each user pair can have a guaranteed slot for transmitting information. However, the system capacity is low since a slot is assigned to each user and no re-allocation of slots is performed if a user decides not to utilize (that is, transmit information during) an assigned slot.

Figure 3:
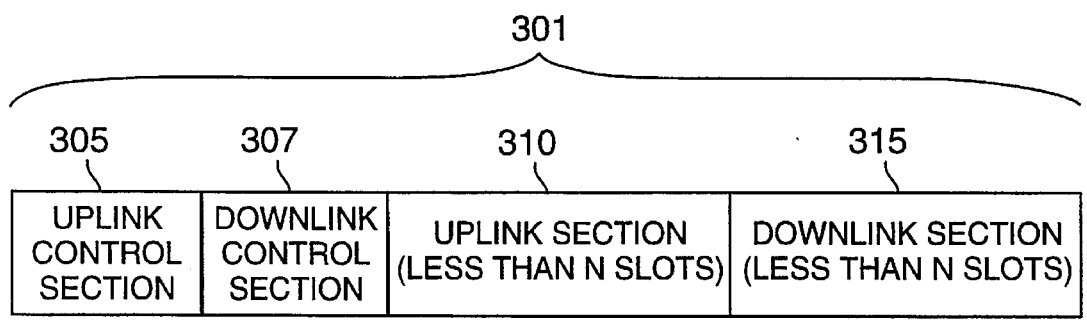
FIG. 3 is a diagram of a TDMA/TDD/SAD frame format known in the prior art.

Better utilization of network resources is obtained if the speech users are statistically multiplexed through the use of speech activity detection (SAD). FIG. 3 illustrates the format of TDMA/TDD/SAD frame 301 designed for use by up to N user pairs. TDMA/TDD/SAD frame 301 is divided into four sections. Uplink and downlink control sections 305 and 307 contain bits for handling call management functions. Uplink control section 305 contains bits for handling requests for uplink information slots. Downlink control section 307 contains bits which indicate which uplink and downlink information slots are assigned for the uplink and downlink users to send and receive information. Uplink section 310 and downlink section 315 are also divided into slots. There are an identical number of slots, fewer than N, in each of the uplink and downlink sections. The SAD techniques recognize that a significant portion of any information transfer, particularly a speech conversation, is comprised of silent portions, and no transmission of information need occur, that is, although N user pairs are active and wish to transmit information at some point, chances are that not all users are using their allocated slots 100% of the time. Thus, the number of slots required to satisfactorily accommodate up to N user pairs can be significantly reduced through ongoing reassignment of slots from inactive to active users. The result is a higher capacity (since there will be a reduced number of slots transmitting no information) and lower delay (since the frames can be made shorter given the reduced number of slots) system. However, the system typically requires a greater portion of the frame be devoted to overhead (that is, the control sections). Additionally, there will be insufficient resources to accommodate all users in times of peak demand, and thus some information will be lost because no slots will be available for data transmission and/or new user pairs will not be allowed access to the system.

Figure 4:
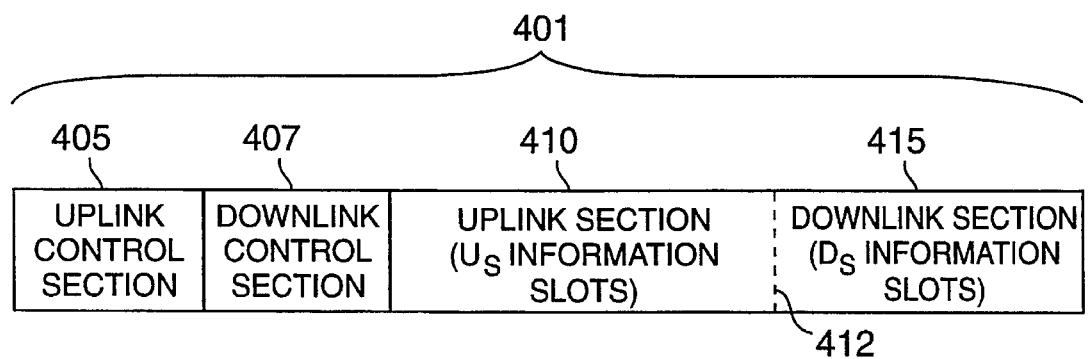
FIG. 4 is a diagram of a Shared Time-Division Duplexing (STDD) frame format.

FIG. 4 illustrates a format for frame 401 useful in practicing the invention. The invention, a multiple access system termed Shared Time-Division Duplexing (STDD), is designed to regulate traffic among up to N user pairs while allocating slots between uplinks and downlinks dynamically, for example, on a frame-by-frame basis. Frame 401 is divided into four sections. Call management functions are handled by separate uplink and downlink slots in uplink control section 405 and downlink control section 407, respectively, as described below. The remainder of frame 401 is divided into S slots, $S=U_s+D_s+A$, with $U_s$ slots allocated for uplink information transfer and $D_s$ slots allocated for downlink information transfer. A represents the number of slots, if any, not allocated. In frame 401 of FIG. 4, A=0. The number of slots allocated between uplink section 410 and downlink section 415 can vary with each frame as indicated by partition 412. However, the total number of speech slots S remains fixed for every frame. When there are a few users in the system and the total number of slots in any one direction is less than S/2, the information slots behave in a TDD manner with the S slots equally partitioned for the uplink and downlink access. When the number of users increases and the number of required speech slots in either direction exceeds S/2, partition 412 between the uplink and downlink slots varies according to demand.

The ability to share a common frequency band contributes to a higher statistical multiplexing gain even for a narrowband system with a limited number of users. The value of S typically is selected based on three factors: 1) the desired quality of the received information, that is, what level of packet loss is acceptable, 2) the number of user pairs to be accommodated, and 3) the accuracy of the speech activity detector, that is, how well silences and pauses in information transfers can be detected. For example, for a system with N=32 user pairs, 64 speech slots are required for standard TDMA/TDD while TDMA/TDD/SAD requires 46 speech slots at a high quality packet dropping rate of 0.01%. STDD typically requires 35 speech slots assuming a 2 millisecond frame size at the same dropping rate. The total statistical multiplexing gain is a function of the exact design of the control information.

Figure 5:
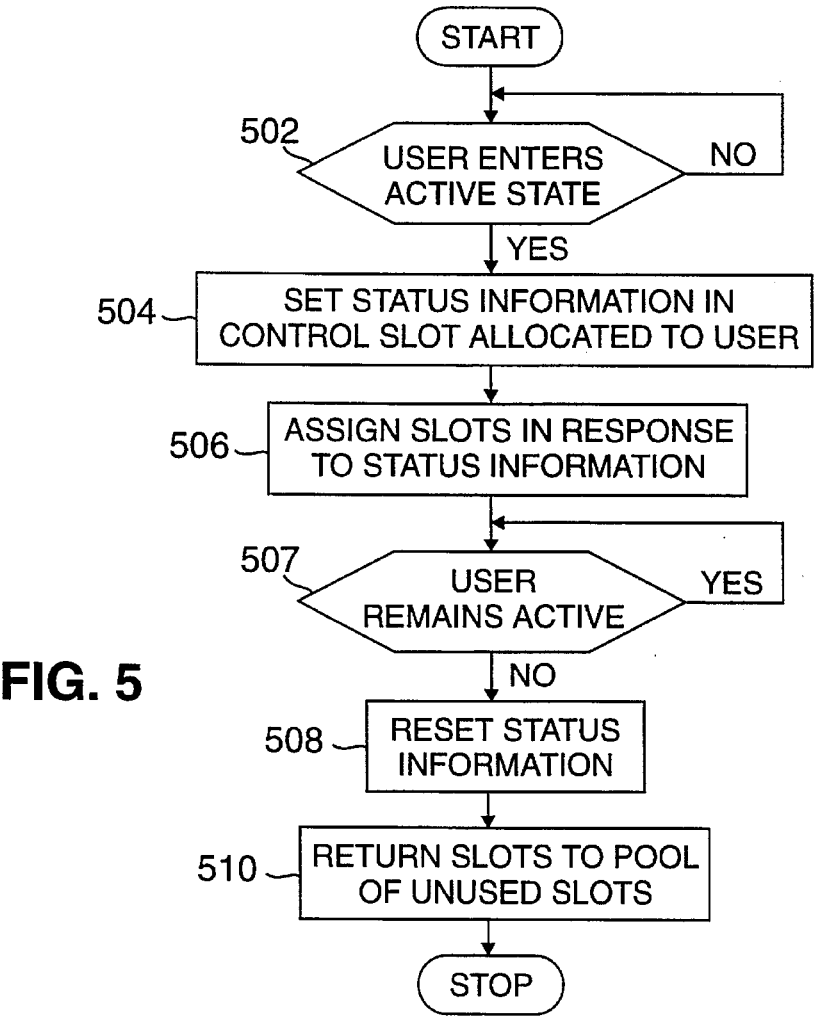
FIG. 5 is a flowchart of the steps in allocating slots in a frame in the present invention.

FIG. 5 is a flowchart of the steps in allocating slots. Note that all signalling functions pertaining to call management in a cellular or microcellular system, including handoffs and termination, but typically not call set up functions, are communicated via information in the control sections. In addition, the control information also indicate the state of a transmission, that is, whether a user is actively communicating information or is silent. When a user desires to send information and enters the active state in step 502, as for example when speaking, status information in the control slot assigned to the user requests a slot in the appropriate, that is, uplink or downlink, information section from the base station as shown in step 504. Typically, this may be implemented using a first-in, first-out (FIFO) service discipline in assigning information slots to users although other disciplines such as, for example, random service, may also be used. Similarly, the base station is aware of all slot requests emanating from the wired end of the network, and it assigns slots accordingly in step 506. The slot assignment information is carried in the downlink control information slots for both uplink and downlink users. Thus, it is advantageous to have transmission of uplink control information precede in time transmission of downlink control information so as to reduce delay. If a slot is not allocated to a user upon request, the information is dropped. When the information transfer is complete, the status information is reset in step 508 and the slot is returned to a pool of unused slots in step 510. The amount of control information is dictated by the needs of call management functions and the frequency of transmission activity.

The use of separate control and information slots helps alleviate the overhead efficiency problem common in PRMA-type networks and permits implementation of a simple access mechanism that advantageously works with speech activity detection while providing low access delay. Uplink control section 405 and downlink control section 407 may each contain N control slots. However, the overhead per frame can be reduced by establishing a duty cycle for the control information. For example, let the total number of control slots be 2 C, where C is the number of uplink or downlink control slots, and let N (N being a multiple of C) be the maximum number of user pairs that can be supported. In general, C<N, and hence only C user pairs can communicate their control information to and from the base station in one frame period. Thus, it takes a total of K=N/C frame periods for all user pairs to be serviced this way, that is, K is the duty cycle to service all users. This access mechanism ensures that all users are guaranteed service within K frame periods. At the same time, since acknowledgements are communicated within the same frame period, a user with an acknowledged reservation can immediately send his speech packets within the same frame. Note that when a user makes a reservation for speech packets the user keeps the reservation for a minimum of K frame periods. For example, if the frame period is 2 ms, N=40, and C=5, then the duty cycle is 8 with a cycle period of 16 ms. Of course, the larger the duty cycle the smaller the amount of control overhead information. In STDD, a suitable cycle period is 16 ms where it is conveniently synchronized to the speech activity detection rate.

Even in the STDD system there may be situations where not all information slots are utilized, that is, A≠0. This spare capacity can be used for call setup when a new call arrives into the system. Assume that a new user monitors the control slots for a minimum of one cycle period to ascertain the status of the information slots, that is, to determine if all slots have been assigned. Thereafter, the system can use the spare information slots as a contention channel to inform the base station of this setup request by using, for example, an ALOHA-type of random access. If there are a number of available slots A, where A is less than S, the new call randomly selects one of these A slots to transmit its setup request packet. This request successfully reaches the base station if no other user transmits in the same slot. If the total number of user pairs currently serviced is less than N, the new call will be successfully serviced and an acknowledgment is sent on the next available downlink control slot. The location of this control slot also determines the new call's position in the control cycle stream. As noted above, when there are few users, STDD behaves as a TDMA/TDD/SAD system with slots equally allocated between the uplink and downlink. In this case, spare information slots used to set up a call should be treated as information slots so that slots remain equally allocated until such time that conditions demand that the partition between uplink and downlink slots be moved. The system above is described for up to N user pairs per carrier frequency. A number of carrier frequencies, each carrying up to N user pairs, can be used in high traffic areas.

Although the previous embodiments have focussed primarily on speech transmission, STDD can be used for mixed traffic conditions, for example, where some slots carry data and some carry speech. STDD can also be implemented in a variable rate per user mode, for example, a variable speech quality mode where a larger number of bits are allocated to customers requiring video or higher quality audio. The control channel contains the appropriate information. Thus, this method can be advantageously used where there is a broadband/narrowband information transfer between users in a user pair. In further embodiments, the dynamic allocation of slots between the uplink and downlink based on demand is implemented by means of frequency division where information is carried over dynamically allocated orthogonal frequency channels, or alternatively in a code division mode where traffic is carried by means of direct sequence spread spectrum with pseudo-orthogonal codes or in combinations of time division, frequency division and code division techniques. In another embodiment, the STDD format can be used in conjunction with a pseudo-analog skewed DPSK modulation technique to further reduce throughput delay in a communications system. Additional detail regarding pseudo-analog skewed DPSK modulation may be found in, for example, the above-cited article by T. Miki et al. entitled "Pseudo-Analog Speech Transmission in Mobile Radio Communication Systems," which is incorporated herein by reference.

The above detailed description has illustrated a method in which slots in a frame are dynamically allocated between uplink and downlink users. The method has not been limited to specific hardware or software. Instead, the method has been described in such a manner that those skilled in the art can readily adapt such hardware or software as may be available or preferable.

Although the exemplary STDD techniques described above provide considerable improvements in wireless communication systems, performance may be limited in certain embodiments by factors such as co-channel interference (CCI) and the runlengths of dropped packets.

Figure 6:
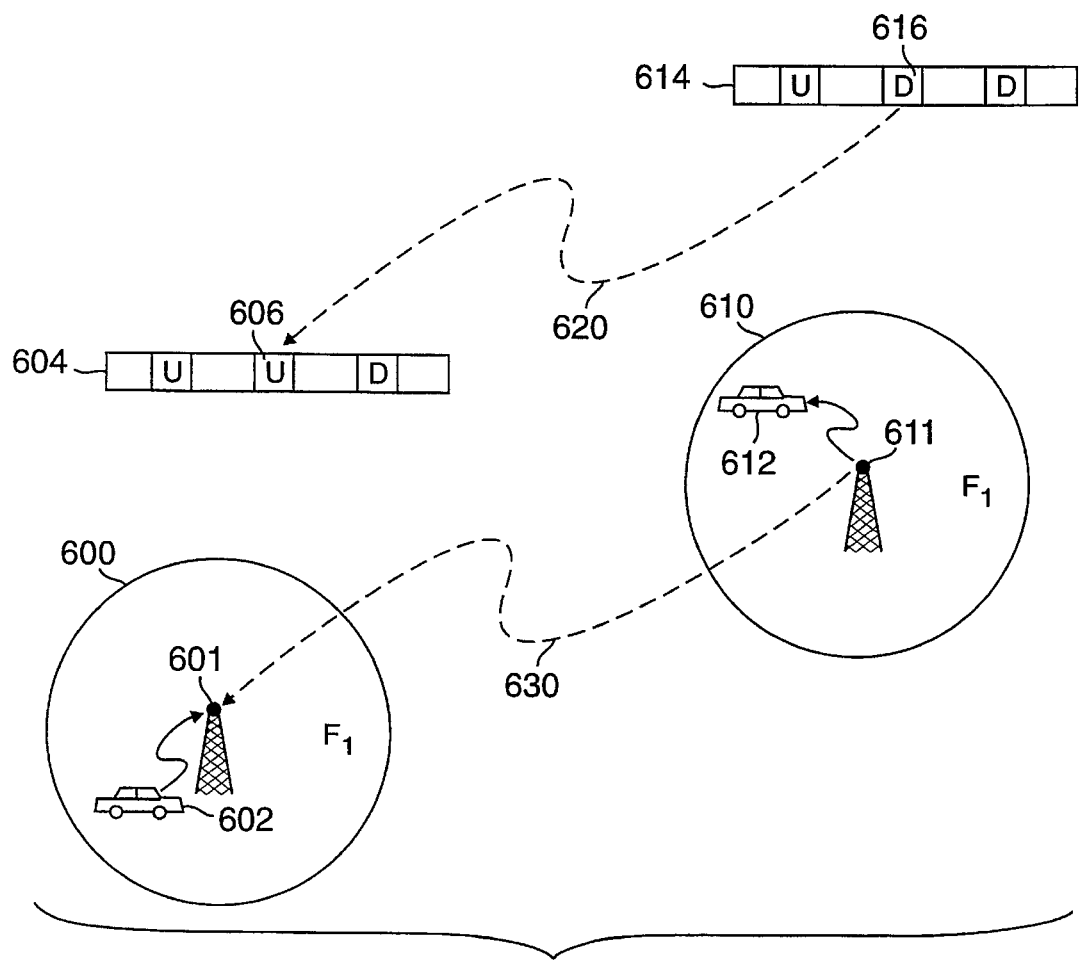
FIG. 6 illustrates "mixed" co-channel interference (CCI) in an exemplary wireless STDD communication system.

FIG. 6 illustrates an exemplary type of CCI which may arise in a TDMA/STDD cellular communication system. A first cell 600 includes a base station 601 for transmitting downlink information to and receiving uplink information from a mobile user 602. The cell 600 operates at a channel carrier frequency F1. The user 602 may transmit an uplink packet to base station 601 at carrier frequency F1 in a frame 604. The frame 604 includes one or more uplink time slots 606 which are dynamically allocated to the user 602 in accordance with an STDD technique such as that described above. A second cell 610 includes a base station 611 for communicating with users within the cell 610. The cell 610 also operates at a channel carrier frequency F1 and cells 600 and 610 are therefore referred to herein as neighboring frequency reuse (FR) cells. A mobile user 612 in cell 610 may receive a downlink packet from the base station 611 in a frame 614. The downlink packet is transmitted in one or more time slots 616 of frame 614 which are dynamically allocated to the user 612 in accordance with an STDD technique. Both the mobile users 602, 612 and the base stations 601, 611 are equipped with omni-directional antennas in this example.

Unlike a TDD technique in which fixed time slots are allocated to uplink and downlink transmission, the STDD techniques of the present invention allow time slots to be dynamically allocated to either uplink or downlink transmission depending on demand. FIG. 6 shows that the user 602 may therefore be transmitting information in uplink slot 606 to base station 601 at the same time that base station 611 in neighboring FR cell 610 is transmitting in downlink slot 616 to user 612. Because signals transmitted from a base station are often at a significantly higher power level than signals transmitted from a mobile user, the downlink signal transmitted in slot 616 can interfere with the uplink signal transmitted in slot 606. The interference between frame time slots 616 and 606 is indicated in FIG. 6 by dashed line 620. The interfering signal is indicated by dashed line 630. Because this type of CCI involves a high power downlink signal 630 from a base station interfering with reception of a lower power uplink signal from a mobile user, it is referred to herein as "mixed" CCI. In certain cases this type of interference may produce a received signal-to-interference ratio (S/I) at base station 601 that results in a dropped packet in uplink time slot 606. Mixed CCI in an STDD system can thus significantly increase the packet-dropping rate and thereby reduce system capacity. It should be noted that mixed CCI can also involve an uplink signal from one user interfering with another user's reception of a downlink signal transmitted by a base station in the same time slot. The latter type of mixed CCI is usually not a serious problem due to the fact that base station transmitting power is typically much higher than that of a mobile user.

Mixed CCI generally does not arise in properly-synchronized prior art TDMA/TDD and TDMA/TDD/SAD systems. However, these prior art systems can exhibit "regular" CCI arising from, for example, interference between two different downlink signals or between two different uplink signals in neighboring FR cells. Regular CCI is common to most cellular systems which utilize frequency reuse to expand system capacity, and the distance between neighboring FR cells is selected such that regular CCI is at or below an acceptable level. If mixed CCI can be controlled or eliminated, the remaining regular CCI in an STDD system would generally be no greater than that in conventional TDMA/TDD and TDMA/TDD/SAD systems.

The present invention provides a number of techniques which can be used to reduce mixed CCI in an STDD system. One technique involves an alternative allocation of uplink and downlink slots in an STDD frame, and is referred to as partially-shared time-division duplexing (PSTDD). Another involves the use of directional base station antennas for both reception and transmission in conjunction with an appropriate slot-direction organization of the STDD frame. These techniques may be used together or separately. Although the CCI reduction techniques are described herein in conjunction with an exemplary type of STDD, it will be readily apparent to those skilled in the art that the techniques are more generally applicable to any multiple access communication system in which uplink and downlink slots are dynamically allocated.

Figure 7:
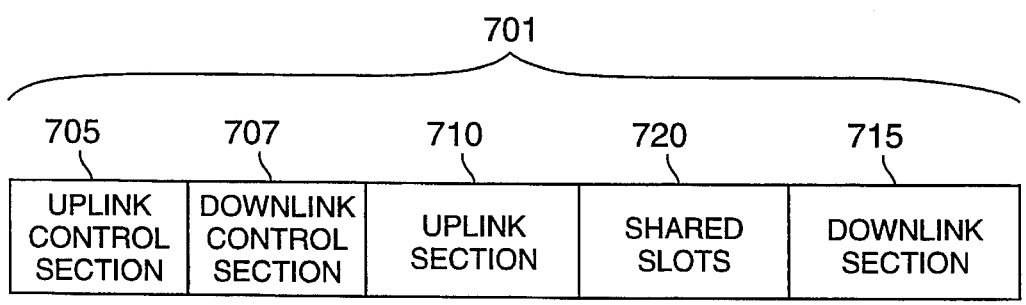
FIG. 7 is a diagram of a partially-shared time-division duplexing (PSTDD) frame format in accordance with the present invention.

FIG. 7 shows an alternative STDD frame 701 in accordance with the present invention. The frame 701 includes uplink and downlink control sections 705, 707 and uplink and downlink information sections 710, 715. The STDD frame 701 also includes a group of shared slots 720. The shared slots 720 represent a subset of the total number of available information transmission slots in the frame 701. The uplink and downlink sections 710, 715 contain slots which are permanently allocated to uplink and downlink information transmission, respectively. Although frame 701 is illustrated as an embodiment in which the number of unused slots A is equal to zero, other embodiments could include values of A greater than zero. Sections 710, 715 are thus similar to the sections 310, 315 in frame 301 of FIG. 3. The shared slots 720 are dynamically allocated between uplink and downlink transmission in accordance with demand, in a manner similar to the allocation of slots in sections 410 and 415 of FIG. 4. In the exemplary frame 701, therefore, only a subset of the total available information slots are dynamically allocated, while the remaining information slots are assigned to either uplink or downlink transmission. This alternative STDD technique is referred to herein as PSTDD. Because only a subset of the available slots are dynamically allocated, the potential for mixed CCI is reduced. The fraction of total available information slots which are shared is designated by a partial sharing factor $\eta$ and different PSTDD techniques may therefore be referred to as PSTDD($\eta$) techniques. In a PSTDD($\eta$) system with a total of S time slots for information transmission, there are $(S/2)(1-\eta)$ slots available only to the uplink users, $(S/2)(1-\eta)$ slots available only to the downlink users and the remaining $S\eta$ slots are shared among uplink and downlink users according to demand. In general, PSTDD systems with partial sharing factors $\eta$ of between about 15% and 25% exhibit packet-dropping rates similar to those of corresponding STDD systems, but can provide a reduction in mixed CCI. Other partial sharing factors $\eta$ could also be used.

Figures 8A, 8B:
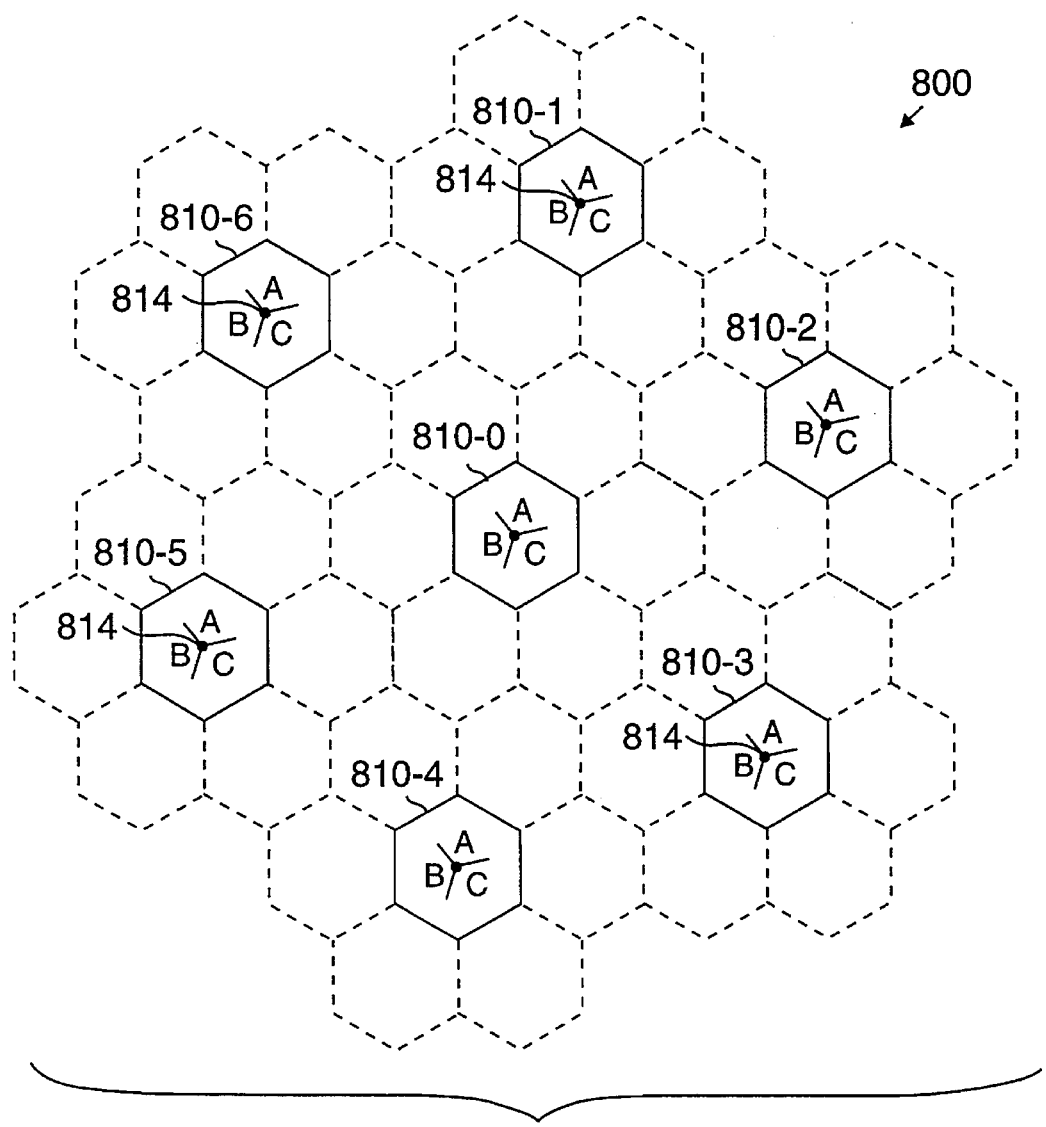
FIG. 8A shows an exemplary STDD cellular communication system with 120° directional antennas and reduced CCI in accordance with the present invention.
FIG. 8B shows a slot-direction frame organization suitable for use in the system of FIG. 8A.

FIG. 8A shows an exemplary wireless communication system 800 in accordance with the present invention. The geographic area serviced by system 800 is divided into cells which are arranged in a hexagonal pattern based on cell groups in which six cells surround a center cell. For clarity of illustration only a portion of the cells in the system 800 are shown. A number of frequency reuse (FR) cells 810-i are shown in solid outline. Each of the FR cells 810-i shares at least one common channel carrier frequency. The cells 810-i thus represent a subset of the total number of cells within the system 800. Other cells which utilize different channel carrier frequencies are located adjacent each of the FR cells 810-i and several are shown in dashed outline. The particular cell pattern shown in system 800 is illustrative only and the present invention may be utilized in systems with any of a number of other cell patterns. The FR cells which are located adjacent to and surround a given FR cell 810-i are its neighboring FR cells and are also referred to herein as "first tier" potential interferers. There are a total of six first tier potential interferers for each FR cell 810-i in the seven-cell hexagonal FR pattern of FIG. 8A. Downlink signals from the neighboring FR cells of a given FR cell can produce mixed CCI within the given cell in the manner described previously. The seven-cell hexagonal pattern typically repeats such that an outer cell 810-i in one seven-cell group may also be a central cell 810-1 in another seven-cell group in the system. As used herein, the term "neighboring FR cell" is intended to include any cell which can produce CCI in a given cell, and thus includes not only first tier interferers but also cells located further from the given cell.

In this exemplary embodiment, each cell includes a base station 814 which communicates with users in the cell via three directional antennas A, B and C. Mobile users within the geographic area serviced by system 800 can communicate with each other and a public telephone network via base stations 814. The directional antennas in a given cell are arranged such that each antenna transmits over an area defined by an angle of about 120° relative to the cell base station 814. In this embodiment, the three directional antennas A, B and C together provide a full 360° of communication coverage around a given base station 814. Of course, other embodiments could provide any number of alternative ranges of coverage. A conventional cellular system which utilizes directional antennas and a seven-cell hexagonal FR pattern may be vulnerable to mixed CCI if used with an STDD slot allocation technique. The present invention provides an arrangement of directional antennas and a corresponding slot-direction frame organization which together significantly reduce mixed CCI. Although the directional antennas are primarily referred to herein as separate antennas, it will be apparent to those skilled in the art that individual directional antennas herein may also be implemented as, for example, different sectors of the same multi-sector antenna.

FIG. 8B shows an exemplary slot-direction frame organization which may be used in conjunction with the directional antennas A, B and C of FIG. 8A to reduce mixed CCI in the system 800. Although it will be assumed in the examples described below that the portion of the frame which is subject to slot-direction organization includes only the information time slots of the frame, it should be understood that the frame control information may be organized in a similar manner or, for example, transmitted and received omni-directionally. FIG. 8B shows time periods for which particular base station directional antennas receive uplink information and transmit downlink information during a given STDD frame 850. An uplink portion 852 of the frame 850 is allocated to reception of uplink information via the directional antennas. The uplink portion 852 is divided into three sub-portions A, B and C during each of which one of the three directional antennas receives uplink information from the users. A downlink portion 854 of the frame 850 is allocated to transmission of downlink information to the users via the directional antennas. The downlink portion 854 is also divided into three sub-portions during each of which one of the three directional antennas is transmitting downlink information. The same frame organization is utilized by each of the cell base stations and mobile users in the system 800. It should be noted, however, that variations in the antenna and frame configuration may be used in, for example, a cell located at an edge of the system. An additional portion 856 of the frame 850 includes slots which are not allocated to either uplink or downlink communication. During periods of peak demand, the slots in the portion 856 will be allocated to either uplink or downlink in the manner previously described.

The manner in which the frame organization shown in FIG. 8B reduces mixed CCI will now be described. $A_i$, $B_i$, $C_i$ are used to refer to the directional antennas in a given cell 810-i. The directional antennas in the center FR cell 810-0 in the group of seven FR cells 810-i shown in FIG. 8A are thus denoted as $A_0$, $B_0$, and $C_0$. The outer six cells 810-i are numbered with the uppermost cell as the first cell 810-1 and the remaining cells numbered in clockwise order starting from cell 810-1. Mixed CCI can arise if, for example, directional antenna $A_0$ is attempting to receive uplink signals from users during the same time slots in which directional antennas $C_1$, $B_2$ and $C_2$ are transmitting downlink signals to users. The antennas $C_1$, $B_2$ and $C_2$ are thus potentially-interfering antennas and the antenna $A_0$ is a potentially-interfered-with antenna in system 800. The exemplary frame organization of FIG. 8B therefore allows, for example, directional antennas $C_1$, $B_2$ and $C_2$ to transmit downlink signals during periods of time in which antenna $A_0$ is not receiving uplink signals. Similar mixed CCI scenarios can arise between other first tier interfering cells 810-i and the central cell 810-0, and between other cells in system 800. The frame 850 is organized such that overlap between uplink and downlink time slots utilized by potentially-interfering directional antennas is minimized. FIG. 8B indicates that the uplink users of a given directional antenna $A_i$ are served during a given frame before the uplink users of directional antennas $B_i$ and $C_i$. Similarly, the downlink users of antenna $A_i$ are served during a given frame before the downlink users of antennas $B_i$ and $C_i$. It will be apparent to those skilled in the art that any of a number of alternative frame organizations may also be utilized to minimize mixed CCI in accordance with the present invention. For example, the downlink users of antennas $C_i$ and $B_i$ could be served after those of $A_i$ because, for example, the downlink users of antennas $A_1$, $A_2$ generally do not interfere with the uplink users of antenna $A_0$. Alternatively, the antenna order within the frame could be completely reversed, or the position assigned to antenna B in the frame could be swapped with the position assigned to antenna C. These alternative slot-direction organizations should be applied in a consistent manner for each non-edge cell in the system. Additional alternative slot-direction frame organizations could utilize other permutations of the exemplary order shown in FIG. 8B.

Figures 9A, 9B:
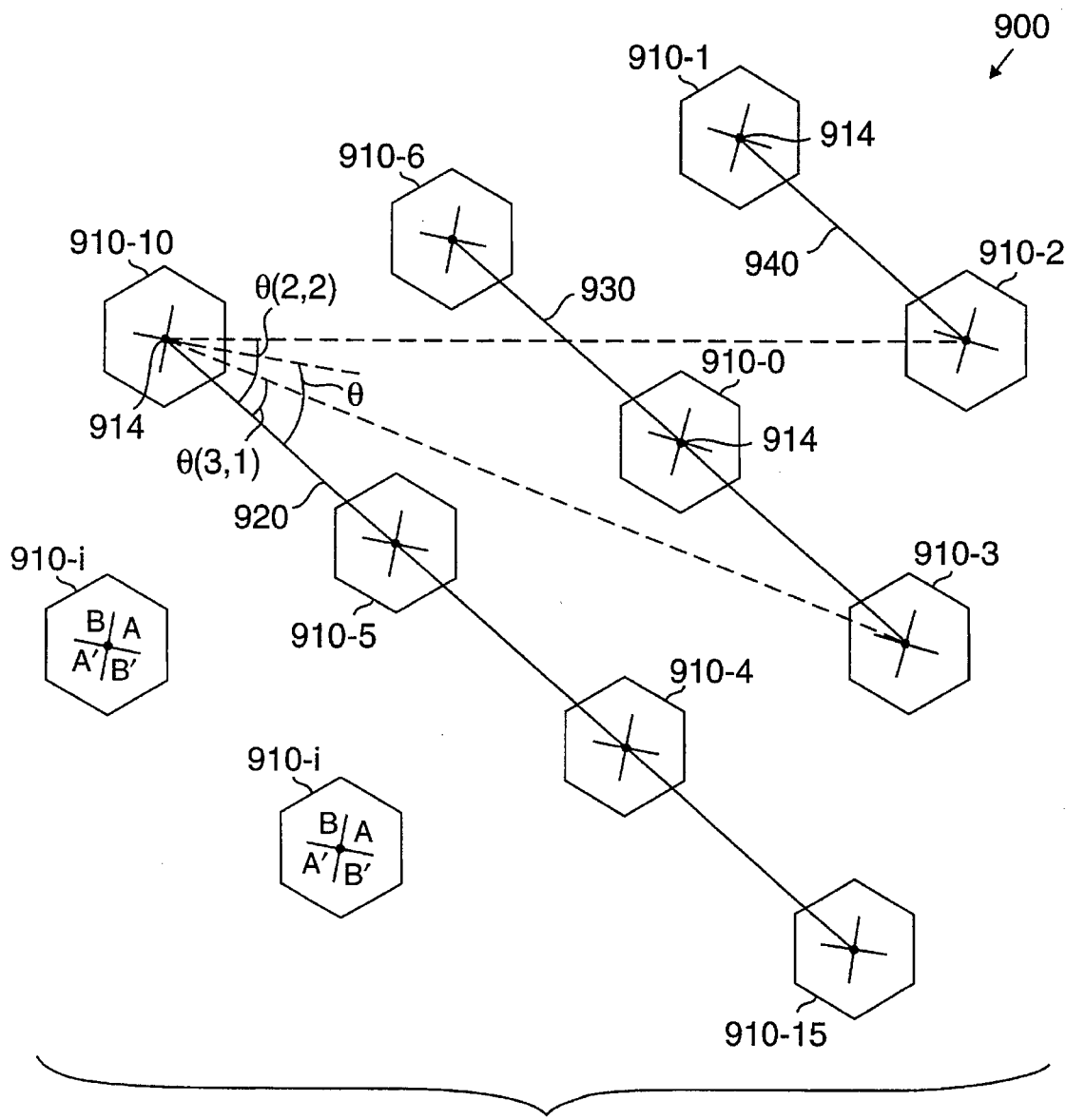
FIG. 9A shows an exemplary STDD cellular system with 90° directional antennas and reduced CCI in accordance with the present invention.
FIG. 9B shows a slot-direction frame organization suitable for use in the system of FIG. 9A.

FIG. 9A shows another exemplary cellular communication system 900 in accordance with the present invention. The system 900 includes a number of FR cells 910-i arranged in a seven-cell hexagonal pattern. Additional cells 910-i are also shown. Each of the cells includes a base station 914 and four 90° directional antennas designated A, B, A' and B'. Antennas A, B are arranged to transmit and receive in directions substantially opposite those of antennas A' and B', respectively. Mixed CCI can arise in the system 900 when, for example, the downlink slots assigned to an antenna A' or B' in one cell interfere with the uplink reception of an antenna A or B, respectively, in a neighboring FR cell.

FIG. 9B shows an exemplary frame organization which may be utilized with the system 900. A frame 950 is separated into an uplink portion 952 in which uplink information is received by the directional antennas in the order A', B', B and A, and a downlink portion in which downlink information is transmitted by the antennas in the order A, B, B' and A'. An additional portion 956 represents time slots which are not used in the exemplary frame 950. The cells 910-i are again numbered such that a central cell in a seven-cell group of FR cells is designated cell 910-0, the uppermost cell in the group is a first cell 910-1, and the remaining outer cells in the group are numbered in clockwise order starting from cell 910-1. The directional antennas in a cell 910-i can be referred to as antennas $A_i$, $B_i$, $A_i'$ and $B_i'$. The exemplary frame organization shown serves the uplink users of an given antenna $A_i$ last among the uplink users. The downlink users are then served by the potentially-interfering antennas such as $A_i'$ in time slots located as far as possible from the frame uplink/downlink boundary in order to reduce mixed CCI. Again, many alternative slot-direction frame organizations suitable for use with 90° directional antennas, including an organization which utilizes the opposite antenna order, will be readily apparent to those skilled in the art.

Referring again to FIG. 9A, another aspect of the present invention involves determination of an appropriate rotation angle θ for the directional antenna configuration in a given cell. In cellular systems with, for example, 90° or 45° directional antennas, proper selection of the rotation angle θ can minimize the number of potential interferers in the cellular system. The rotation angle θ is measured in this example as the angle between an edge of one of the directional antennas and a solid line 920 connecting the base station 914 of cell 910-10 with that of its closest neighboring FR cell 910-5. A given rotation angle may be specified in terms of other FR cells which become potential interferers when that angle is used. These potential interferers are characterized herein as being located (m,n) steps in the FR pattern from a given cell and the rotation angle can therefore be expressed as θ(m,n). Various possible rotation angles θ(m,n) are shown in FIG. 9A. The cells located along the line 920, that is, cells 910-5, 910-4, and 910-15, are designated in (m,n) notation as (1,0), (2,0) and (3,0), respectively. In a similar manner, cells 910-6, 910-0 and 910-3 along line 930 are designated as (1,1), (2,1) and (3,1), respectively, and cells 910-1 and 910-2 along line 940 are designated as (1,2) and (2,2), respectively. It should be noted that the (m,n) notation is adopted herein to facilitate characterization of the rotation angle θ, and that alternative notations could also be used.

FIG. 9A shows a rotation angle θ(3,1) in which a potential interferer cell 910-3 is located (3,1) steps in the FR pattern away from cell 910-10, and a rotation angle θ(2,2) in which a potential interferer cell 910-2 is located (2,2) steps in the FR pattern away from cell 910-10. In general, cells which are located (m,n) steps away from the cell of interest can become potential interferers of that cell. After a certain number (M,1) of steps in the FR pattern, the effects of interference from a potential interferer (M,1) steps away becomes negligibly small. Values of rotation angle θ suitable for use in reducing mixed CCI therefore include values in the following range:

$$0 < \theta < \theta(M,1).$$

As noted above, a value of θ equal to zero corresponds to aligning the edge of one of the directional antennas to a line, such as line 920, connecting a given cell of interest to the center of any one of the first tier FR cells. In a system with a hexagonal cell pattern, the values of θ(m,n) which result in additional interference are given by:

$$\theta(m, n) = \arctan\left( \frac{\frac{\sqrt{3}}{2} n}{m - \frac{\text{rem}(n, 2)}{2}} \right),$$

in which rem(n,2) equals zero when n is even and equals one when n is odd. Suitable values of rotation angle θ are therefore those in the above-specified range below the following upper bound:

$$\theta(M, 1) = \arctan\left( \frac{\frac{\sqrt{3}}{2}}{M - \frac{1}{2}} \right).$$

For example, the upper bound θ(M,1) for M=θ5 is about θ10.9°. This means that if a value of θ less than about θ10.9° is selected, interference is minimized from all cells located less than or equal to the distance of cell (5,1) from the given cell, while interference from cells located beyond that distance from the given cell is considered negligible. Selection of an appropriate rotation angle θ may thus improve system performance by limiting the number of neighboring FR cells which are potential interferers of a given cell. As shown in system 900 of FIG. 9A, the same rotation angle θ may be used for each of the cells in the system. The use of 90° directional antennas and an appropriate rotation angle θ can provide performance which in the exemplary seven-cell hexagonal system shown is superior to that of the 120° directional antenna embodiment described above in conjunction with FIG. 8A. Although illustrated in an embodiment with 90° directional antennas, the above-described rotation angle selection techniques can also be used in other embodiments of the present invention including, for example, those with 45° directional antennas.

Figure 10A:
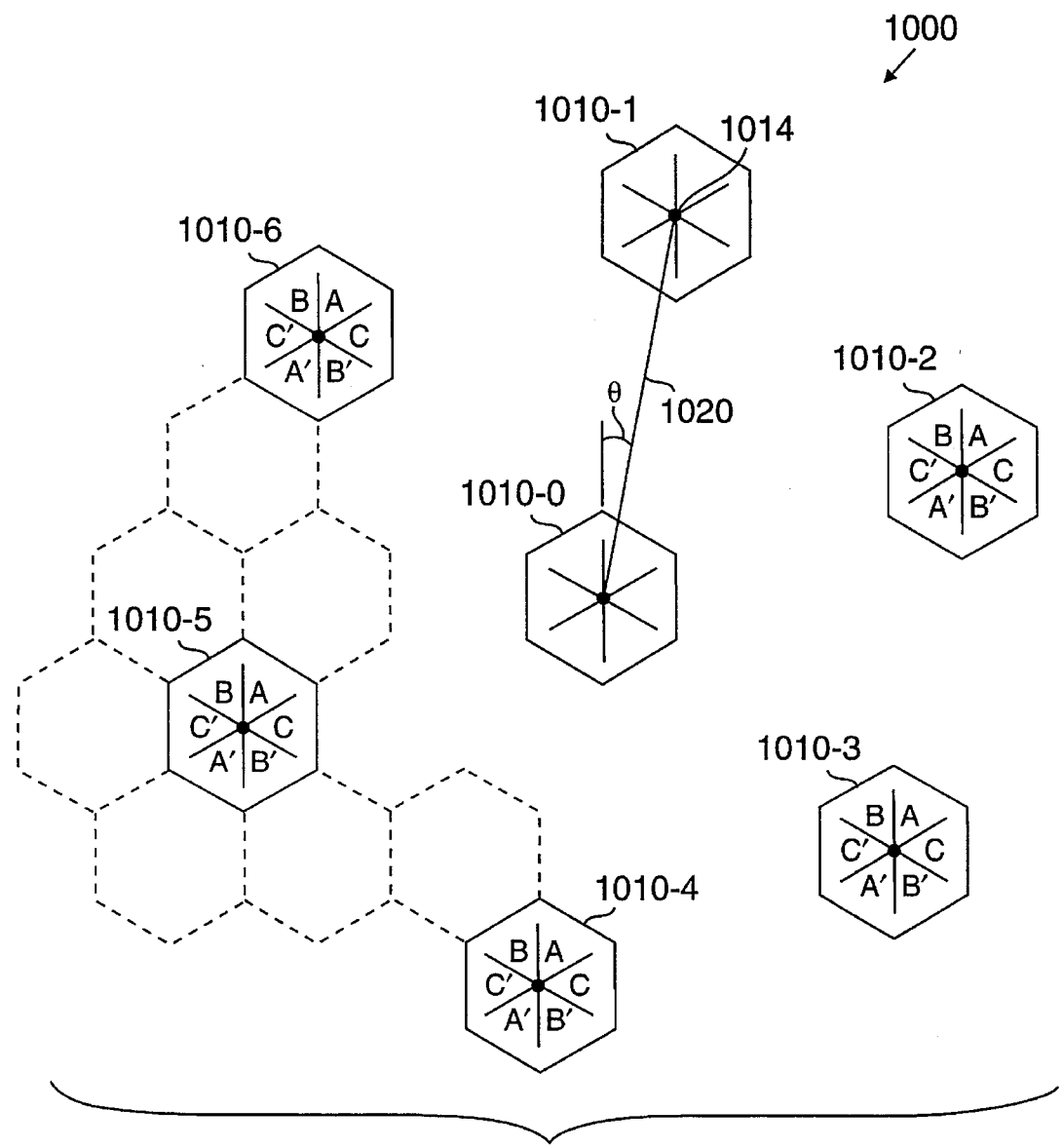
FIG. 10A shows an exemplary STDD cellular system with 60° directional antennas and reduced CCI in accordance with the present invention.

FIG. 10A shows an embodiment of the present invention which utilizes 60° directional antennas. A system 1000 includes a number of outer FR cells 1010-i arranged around a center cell 1010-0 in a seven-cell hexagonal pattern. A number of non-FR cells are shown in dashed outline adjacent the FR cell 1010-6. Each cell includes a base station 1014 which communicates with users over 60° directional antennas A, B, C, A', B' and C'. In this embodiment, the uplink of an antenna A is potentially interfered with by the downlink of an antenna A', the uplink of B is potentially interfered with by the downlink of B', and so on. As in previously-described embodiments, each cell in system 1000 includes the same antenna configuration arranged at substantially the same rotation angle. In this embodiment the rotation angle θ measured from line 1020 is about 30°. It should be noted that the previously-described determination of a suitable rotation angle need not be carried out in embodiments which utilize, for example, a seven-cell hexagonal pattern with arrangements of 30°, 60° or 120° directional antennas, because such antenna arrangements are substantially symmetric when used in the hexagonal pattern.

Figure 10B:
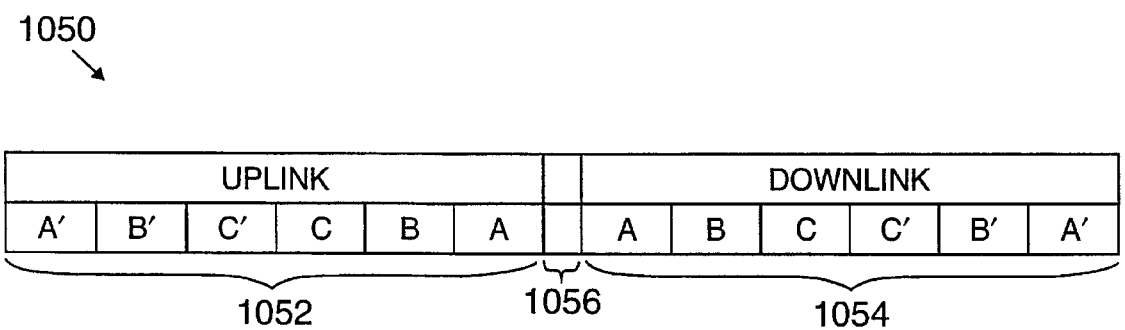
FIG. 10B shows a slot-direction frame organization suitable for use in the system of FIG. 10A.

FIG. 10B shows an exemplary slot-direction frame organization suitable for use with the system of FIG. 10A. As in the embodiments previously described, the potentially interfering antenna uplinks and downlinks are allocated different time slots. A frame 1050 is separated into an uplink portion 1052 in which the directional antennas receive uplink information in the order A', B', C', C, B and A, and a downlink portion 1054 in which the antennas transmit downlink information in the order A, B, C, C', B' and A'. Again, alternative slot-direction frame organizations could also be used, including, for example, an organization with the opposite antenna order. It should be noted that the 60° directional antenna configuration of FIG. 10A, along with the exemplary frame organization of FIG. 10B, virtually eliminates mixed CCI in system 1000, and in a seven-cell hexagonal system can provide performance superior to that of the 120° and 90° antenna embodiments described above. Further reductions in mixed CCI may be achieved by increasing the number of directional antennas and decreasing the coverage angle of each antenna, along with organizing the frame in accordance with the techniques described above. For example, another possible embodiment could utilize twelve 30° directional antennas. As noted above, the present invention may be utilized in systems with a variety of different cell patterns. Additional detail regarding frequency reuse and cell patterns may be found in, for example, V. H. MacDonald, "The Cellular Concept," Bell System Technical Journal, Vol. 58, No. 1, pp. 15–41, January 1991, which is incorporated by reference herein, and the book "Mobile Radio Communications," R. Steele, ed., Pentech Press, 1992.

The exemplary embodiments of FIGS. 8, 9 and 10 illustrate a worst-case mixed CCI scenario experienced in, for example, a central portion of a system. A given FR cell in the central portion has other FR cells on all sides, and therefore the potential for mixed CCI is at a maximum. For FR cells on an edge of the system, however, the potential for mixed CCI is reduced, and those cells could therefore utilize different antenna configurations than the cells in the central portion. For example, a cell on a system edge may utilize fewer directional antennas than a central cell. Those skilled in the art could readily determine other suitable modifications of the antenna configurations and/or frame organizations used in cells on a system edge.

Alternative embodiments of the invention may utilize omnidirectional base station antennas in place of the directional antennas shown in FIGS. 8, 9 and 10. In these embodiments, the frame organization is altered in, for example, neighboring FR cells such that a potentially-interfering omnidirectional antenna in a first cell transmits downlink information in a different portion of the frame than that in which a potentially-interfered-with omnidirectional antenna in the neighboring FR cell receives uplink information. In one preferred embodiment, allocation of uplink slots begins at one end of a given frame, and allocation of downlink slots begins at an opposite end of the given frame, in a manner similar to that shown in FIGS. 8B, 9B and 10B. Thus, if there are an excess number of frame slots, the unused slots are located in a central portion of the frame such as portions 856, 956 or 1056 above. This allocation technique can provide a buffer between uplink and downlink slots in certain situations, and thus tends to reduce mixed CCI. Those skilled in the art can readily determine other suitable frame organizations for use in omnidirectional antenna embodiments of the present invention.

FIG. 11A shows a block diagram of an exemplary base station downlink 1102 in accordance with the present invention. A baseband input signal representing speech, text, video or other information may be received at the base station from, for example, a public telephone network. The baseband signal is processed in a speech coder 1105 and a channel coder 1110 in a manner well-known in the art. Coded information signals are supplied to a modulator 1115 and then to RF transmission hardware 1120 which drives directional antennas A, B and C described above in conjunction with system 800 of FIG. 8A. A downlink processor 1125 coordinates the coding, modulation and transmitting operations of elements 1105–1120 such that downlink information is transmitted to a given user from the appropriate directional antenna A, B or C and in the order specified in the exemplary frame organization of FIG. 8B. Any of a number of techniques may be utilized in downlink 1102 to achieve the desired slot-direction frame organization. For example, control information identifying a particular user and a corresponding antenna may be used by downlink processor 1125 to determine which time slots should be assigned to a given user in order to provide the desired frame organization. The invention may be used in systems which have a control information duty cycle $K \geq 1$, and those skilled in the art can readily determine suitable adjustments in the arrangement and/or processing of the control information for systems with $K>1$. The allocation of particular time slots to a given antenna may occur after the speech and/or channel coding and before the modulation, or at any of a number of other points in the downlink 1102.

FIG. 11B shows an exemplary base station uplink 1132. RF receiving hardware 1140 processes and directs uplink information signals received from users via directional antennas A, B and C. The received uplink signals are demodulated in a demodulator 1145, and then decoded in a channel decoder 1150 and a speech decoder 1155 to generate a baseband output signal which may be supplied to, for example, a public telephone network. An uplink processor 1160 directs the reception, demodulation and/or decoding operations of elements 1140–1155 such that a given antenna A, B or C receives uplink signals for the proper portion of a given frame. This may be accomplished by implementing appropriate system timing and control in a manner well-known in the art. The downlink 1102 and uplink 1132 may also include a channel interleaver and channel deinterleaver, respectively, both implemented in a manner known in the art. The interleaving/deinterleaving may, for example, be included as part of the channel coding/decoding. Although processors 1125 and 1160 are shown as interacting with coding/decoding, modulation/demodulation and RF transmission/reception elements, it should be emphasized that this is by way of illustration only. The processing functions which result in the desired slot-direction frame organization may be incorporated within one or more of the other system elements, rather than provided by a separate processor. In addition, systems in accordance with the present invention may include arrangements of elements other than those shown. For example, those skilled in the art will recognize that the present invention is suitable for use in systems which do not include channel coding. Although channel coding/decoding and interleaving/deinterleaving randomize the channel and thereby mitigate the effects of, for example, channel fading, this generally comes at the expense of increased total delay. A preferred embodiment of the invention therefore eliminates channel coding and channel interleaving and utilizes any of a number of well-known space diversity techniques to address channel fading.

It will also be recognized that certain processing elements similar to those shown in base station downlink 1102 and base station uplink 1104 are also present in the transmitters and receivers utilized by the mobile system users. The processors 1125 and 1160 may be suitably programmed digital computers or microprocessors, application-specific integrated circuits, or any combination of software, hardware and firmware capable of providing the desired slot-direction frame organization. Additional details regarding transmission, modulation, coding, and control information suitable for use with the present invention may be found in, for example, W. C. Wong, C-E. W. Sundberg and N. Seshadri, "Shared Time Division Duplexing: An Approach to Low Delay, High Quality wireless Digital Speech Communications," IEEE Trans. Veh. Tech., November 1994, which is incorporated herein by reference.

Figure 12:
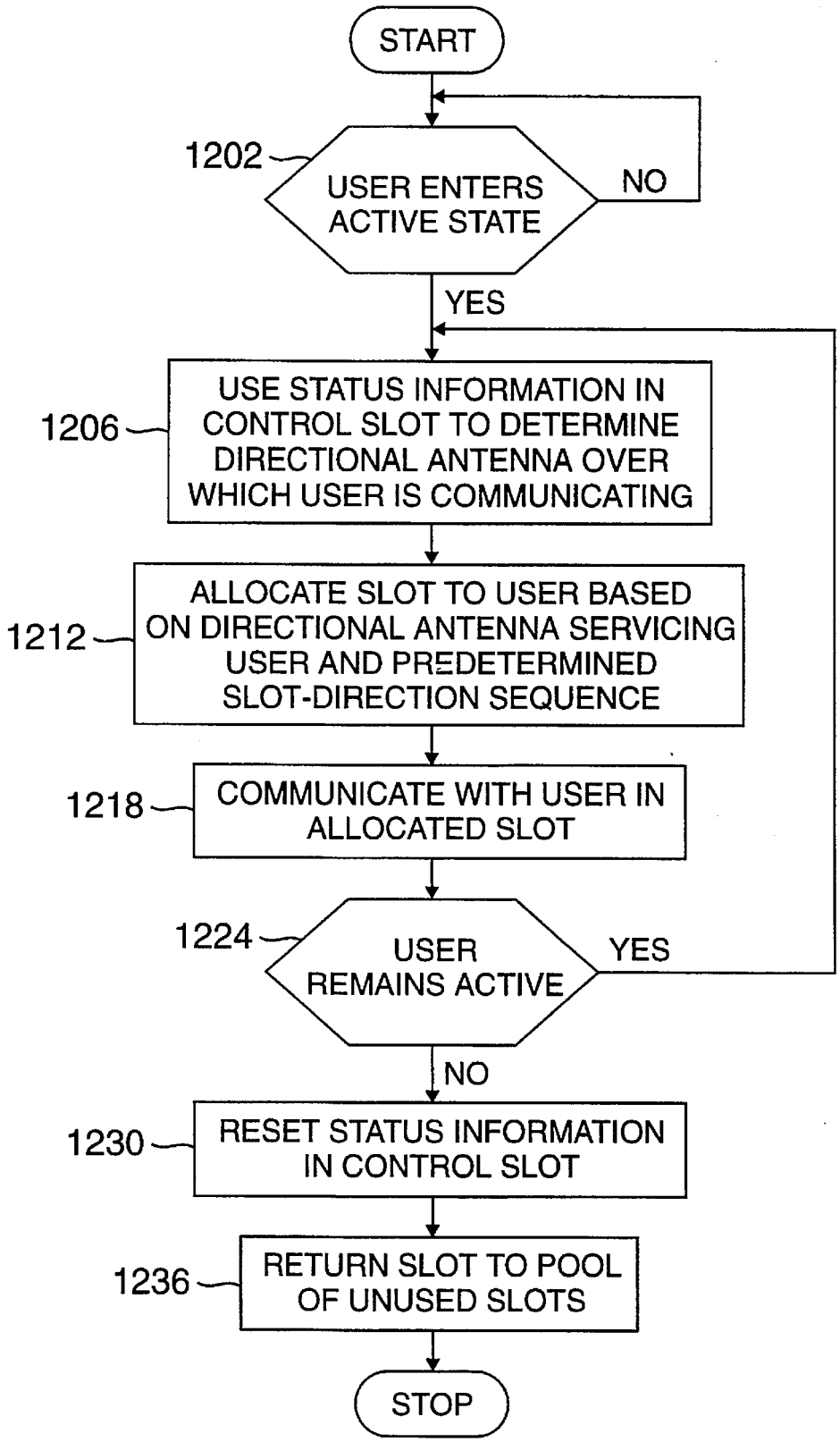
FIG. 12 is an exemplary flow chart illustrating steps involved in supplying portions of a frame to a given directional antenna in accordance with the present invention.

FIG. 12 is a flow chart illustrating the operation of an exemplary embodiment of the present invention. Step 1202 indicates that a determination is first made as to whether a particular user has entered an active state, that is, requested allocation of an information slot. If so, status information transmitted from the user in a control slot is used in step 1206 to identify the base station directional antenna over which the user is communicating. Step 1212 then indicates that the user is assigned a particular slot in accordance with the predetermined slot-direction frame organization, and in step 1218 the user communicates with the base station in the assigned slot. If the user remains active for the next frame, a decision made in step 1224 directs the processor to return to step 1206 to allocate a slot in the next frame in accordance with the predetermined slot-direction organization. After the user becomes inactive, step 1230 indicates that the status information in the control slot corresponding to the user is reset. Any slots allocated to that user are returned in step 1236 to a pool of unused slots. Each time a particular user requests a time slot, a determination is made as to which directional antenna the user is communicating over. The overall assignment of available slots to users is then carried out such that the directional antennas are utilized in accordance with the predetermined slot-direction organization.

It should be noted that the dynamic slot-direction frame organization of the present invention may also be used to improve capacity in, for example, a TDMA/TDD/SAD system. In such an application, the same time slots could be used for all directional antennas within a given cell, since in a TDD system uplink and downlink signals are generally always transmitted in different portions of the frame. However, a number of additional issues may arise in applying the above teachings to TDD systems. For example, if a mobile user is at any time "visible" by two or more directional antennas, the slots assigned to the user can not be reused by any of the corresponding base stations, so fewer information slots may be available. Moreover, there may be significantly more hand-offs than in a conventional omni-directional system, since a hand-off within a given cell in a TDD system means that the user has to be assigned a different time slot, thereby increasing control information.

Additional performance improvements may be obtained in an STDD system in accordance with the present invention by using circular interleaving and/or Fast Speech Activity Detection (FSAD) to reduce the runlength of dropped packets. Circular interleaving and FSAD in an STDD system are described in detail in U.S. patent application Ser. No. 08/364,367 filed Dec. 27, 1994 entitled "Multiple Access Cellular Communication With Circular Interleaving and Reduced Dropped-Packet Runlengths," which is assigned to the assignee of the present invention and incorporated by reference herein.

The present invention provides a number of techniques for allocating frame slots in a multiple access system. Alternative embodiments include frequency-division multiplexed (FDM) systems in which a slot allocated to a user represents one of a number of available carrier frequencies. An example is a shared frequency-division duplexing (SFDD) system. In such FDM embodiments, similar antenna arrangements may be used, and the time frame may be considered a frequency frame. A frame slot herein is thus intended to include, for example, both time and frequency slots. The above STDD teachings can therefore be readily adapted by those skilled in the art to provide a suitable organization of frame frequency slots such that mixed CCI in an FDM system is substantially reduced.

Although the above description illustrates the utility of the present invention primarily in terms of a cellular network incorporating an STDD multiple access technique, it should be understood that the apparatus and methods of the present invention are generally suitable for use with any wireless communication system in which co-channel interference arises. Many variations may be made in the arrangements shown, including the cell pattern and type of frequency reuse, the number and type of directional antennas, the allocation of frame time slots to a given directional antenna and the antenna rotational angle. These and other alternatives and variations in the arrangements shown will be readily apparent to those skilled in the art.

We claim:

1. A communication system for communicating information in slots of a frame, the system comprising:

a first base station associated with a first cell and adapted to transmit downlink information to users in the first cell and to receive uplink information from users in the first cell, the first base station including a potentially-interfering antenna;

a second base station associated with a frequency reuse cell and adapted to transmit downlink information to users in the frequency reuse cell and to receive uplink information from users in the frequency reuse cell, the second base station including a potentially-interfered-with antenna, wherein the potentially-interfering antenna can interfere with reception of uplink information in the potentially-interfered-with antenna; and means for allocating the slots to users in each of the cells such that the potentially-interfering antenna transmits downlink information in a different portion of the frame than that in which the potentially-interfered-with antenna receives uplink information.

2. The system of claim 1 wherein at least one of the potentially-interfering antenna and the potentially-interfered-with antenna is an omnidirectional antenna.

3. The system of claim 1 wherein the first base station has a first set of directional antennas which includes the potentially-interfering antenna, and further wherein the second base station has a second set of directional antennas which includes the potentially-interfered-with antenna.

4. The system of claim 3 wherein the allocating means allocate the slots such that the directional antennas in each base station receive uplink information in one order and transmit downlink information in an opposite order within the frame.

5. The system of claim 3 wherein both the first and second sets of directional antennas include three directional antennas A, B and C with each antenna providing about 120° of coverage around the corresponding base station.

6. The system of claim 5 wherein the allocating means allocate the slots such that the directional antennas receive uplink information in a given order and transmit downlink information in an opposite order and further wherein the given order is [A, B, C] or [C, B, A].

7. The system of claim 3 wherein both the first and second sets of directional antennas include four directional antennas A, B, A' and B' with each antenna providing about 90° of coverage around the corresponding base station.

8. The system of claim 7 wherein the allocating means allocate the slots such that the directional antennas receive uplink information in a given order and transmit downlink information in an opposite order and further wherein the given order is [A, B, B', A'] or [A', B', B, A].

9. The system of claim 3 wherein the first and second sets of directional antennas include six directional antennas A, B, C, A', B' and C' with each providing about 60° of coverage around the corresponding base station.

10. The system of claim 9 wherein the allocating means allocate the slots such that the directional antennas receive uplink information in a given order and transmit downlink information in an opposite order and further wherein the given order is [A, B, C, C', B', A' ]or [A', B', C', C, B, A].

11. The system of claim 3 wherein the means for allocating the slots further includes a processor which uses status information in a control slot of the frame to identify which of the directional antennas is being used by a given user, and which assigns slots based on a predetermined slot-direction frame organization.

12. A method of communicating information in allocated slots of a frame in a communication system, wherein the system includes a first base station associated with a first cell and adapted to transmit downlink information to users in the first cell and to receive uplink information from users in the first cell, the method comprising the steps of:

providing a second base station associated with a frequency reuse cell and adapted to transmit downlink information to users in the frequency reuse cell and to receive uplink information from users in the frequency reuse cell, wherein the first base station includes a potentially-interfering antenna which can interfere with reception of uplink information in a potentially-interfered-with antenna in the second base station; and allocating the slots to users in each of the cells such that the potentially-interfering antenna transmits downlink information in a different portion of the frame than that in which the potentially-interfered-with antenna receives uplink information.

13. The method of claim 12 wherein the step of allocating the slots further includes:

assigning a first portion of the slots in the frame to uplink communication;

assigning a second portion of the slots in the frame to downlink communication; and dynamically allocating a third portion of the slots in the frame to either uplink or downlink communication depending on demand from the users in each of the cells.

14. The method of claim 12 wherein the first base station has a first set of directional antennas which includes the potentially-interfering antenna and further wherein the step of providing the second base station includes providing the second base station with a second set of directional antennas which includes the potentially-interfered-with antenna.

15. The method of claim 14 wherein the step of allocating the slots further includes allocating the slots such that the directional antennas in each base station receive uplink information in one order and transmit downlink information in an opposite order within the frame.

16. The method of claim 14 wherein both the first and second sets of directional antennas include three directional antennas A, B and C with each antenna providing about 120° of coverage around the corresponding base station, and the step of allocating the slots includes allocating the slots such that the directional antennas receive uplink information in a given order and transmit downlink information in an opposite order and further wherein the given order is [A, B, C] or [C, B, A].

17. The method of claim 14 wherein both the first and second sets of directional antennas include four directional antennas A, B, A' and B' with each antenna providing about 90° of coverage around the corresponding base station, and the step of allocating the slots includes allocating the slots such that the directional antennas receive uplink information in a given order and transmit downlink information in an opposite order and further wherein the given order is [A, B, B', A'] or [A', B', B, A].

18. The method of claim 14 wherein both the first and second sets of directional antennas include six directional antennas A, B, C, A', B' and C' with each providing about 60° of coverage around the corresponding base station, and the step of allocating the slots includes allocating the slots such that the directional antennas receive uplink information in a given order and transmit downlink information in an opposite order and further wherein the given order is [A, B, C, C', B', A'] or [A', B',C',C,B,A].

19. In a communication system adapted to communicate information in allocated frame slots on an uplink and downlink between a user and a base station in a cell, a method of allocating slots comprising the steps of:

assigning a first portion of a plurality of slots in a frame for communication on the uplink;

assigning a second portion of the plurality of slots for communication on the downlink; and dynamically allocating slots in a third portion of the plurality of slots to uplink communication or downlink communication in accordance with demand.

20. The method of claim 19 wherein the step of dynamically allocating slots in a third portion of the plurality of slots further includes allocating the slots such that a set of directional antennas at the base station receives uplink information in one order and transmits downlink information in another order within the frame.

21. In a communication system in which information is communicated in slots of a frame between a base station in a given system cell and users in that cell, an apparatus comprising:

antenna means in the given cell arranged to transmit downlink information to the users in the given cell and to receive uplink information from the users in the given cell, wherein the antenna means includes a potentially-interfering antenna which can interfere with reception of uplink information in a frequency reuse cell; and means for allocating the slots to users in the given cell such that the potentially-interfering antenna transmits downlink information in different slots of the frame than those in which the frequency reuse cell receives uplink information.

22. The apparatus of claim 21 wherein the antenna means comprises an omnidirectional antenna.

23. The apparatus of claim 21 wherein the antenna means comprises a set of directional antennas.

24. The apparatus of claim 23 wherein the means for allocating the slots includes a processor adapted to receive status information identifying which of the directional antennas in the set is being used to communicate with a particular user in the given cell, and to direct the allocation of a slot to the particular user in accordance with a predetermined slot-direction frame organization.

25. The apparatus of claim 23 wherein the means for allocating the slots provides a slot allocation such that the directional antennas in the given cell receive uplink information in one order and transmit downlink information in another order within the frame.

26. In a communication system in which information is communicated in slots of a frame between a base station in a given system cell and users in that cell, a method of allocating the slots comprising the steps of:

providing antenna means in the given cell arranged to transmit downlink information to the users in the given cell and to receive uplink information from the users in the given cell, wherein the antenna means includes a potentially-interfering antenna which can interfere with reception of uplink information in a frequency reuse cell; and allocating the slots to users in the given cell such that the potentially-interfering antenna transmits downlink information in different slots of the frame than those in which the frequency reuse cell receives uplink information.

27. The method of claim 26 wherein the step of providing antennas means includes providing a set of directional antennas which include the potentially-interfering antenna.

28. The method of claim 27 wherein the step of allocating the slots further includes the steps of:

identifying which of the directional antennas in the set is being used to communicate with a particular user in the given cell; and allocating a slot to the particular user in accordance with a predetermined slot-direction frame organization.

29. The method of claim 27 wherein the step of allocating the slots further includes allocating the slots such that the directional antennas in the given cell receive uplink information in one order and transmit downlink information in another order within the frame.

30. The method of claim 26 wherein the step of providing antenna means includes providing an omnidirectional antenna.

31. A communication system for communicating information in slots of a frame, the system comprising:

a first base station associated with a first cell and adapted to transmit downlink information to users in the first cell and to receive uplink information from users in the first cell, the first base station including a potentially-interfering antenna;

a second base station associated with a frequency reuse cell and adapted to transmit downlink information to users in the frequency reuse cell and to receive uplink information from users in the frequency reuse cell, the second base station including a potentially-interfered-with antenna, wherein the potentially-interfering antenna can interfere with reception of uplink information in the potentially-interfered-with antenna; and means for allocating the slots to users in each of the cells such that the potentially-interfering antenna transmits downlink information in a different portion of the frame than that in which the potentially-interfered-with antenna receives uplink information, wherein at least a portion of the slots in the frame are allocated dynamically such that given slots in the portion are allocated to either uplink or downlink communication in accordance with demand from the users in each of the cells.

32. The system of claim 31 wherein a first portion of the slots in the frame are assigned to uplink communication, a second portion of the slots in the frame are assigned to downlink communication, and a third portion of the slots in the frame are dynamically allocated to either uplink or downlink communication in accordance with demand from the users in each of the cells.

33. A method of communicating information in allocated slots of a frame in a communication system, wherein the system includes a first base station associated with a first cell and adapted to transmit downlink information to users in the first cell and to receive uplink information from users in the first cell, the method comprising the steps of:

providing a second base station associated with a frequency reuse cell and adapted to transmit downlink information to users in the frequency reuse cell and to receive uplink information from users in the frequency reuse cell, wherein the first base station includes a potentially-interfering antenna which can interfere with reception of uplink information in a potentially-interfered-with antenna in the second base station; and allocating the slots to users in each of the cells such that the potentially-interfering antenna transmits downlink information in a different portion of the frame than that in which the potentially-interfered-with antenna receives uplink information, wherein the step of allocating the slots further includes the step of dynamically allocating slots in at least a portion of the frame to either uplink or downlink communication depending on demand from the users in each of the cells.

34. An apparatus for communicating information in slots of a frame in a system including a first base station associated with a first cell and adapted to transmit downlink information to users in the first cell and to receive uplink information from users in the first cell, the first base station including a potentially interfering antenna, the apparatus comprising:

a second base station associated with a frequency reuse cell and adapted to transmit downlink information to users in the frequency reuse cell and to receive uplink information from users in the frequency reuse cell, the second base station including a potentially-interfered-with antenna, wherein the potentially-interfering antenna can interfere with reception of uplink information in the potentially-interfered-with antenna; and means for allocating the slots to users in the frequency reuse cell such that the potentially-interfering antenna transmits downlink information in a different portion of the frame than that in which the potentially-interfered-with antenna receives uplink information.

* * * * *